Figure 2:
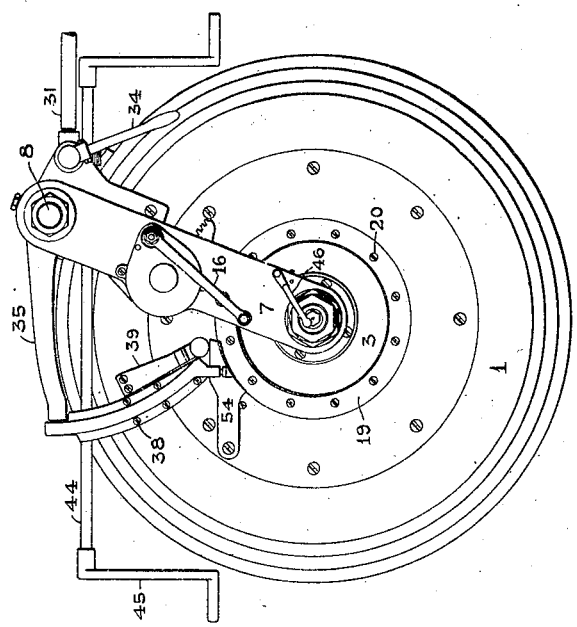

No. 772,345. PATENTED OCT. 18, 1904.
A. H. EMERY.
BREECH LOADING ORDNANCE.
APPLICATION FILED MAR. 2, 1901. RENEWED MAR. 12, 1904.
NO MODEL. 8 SHEETS—SHEET 1.
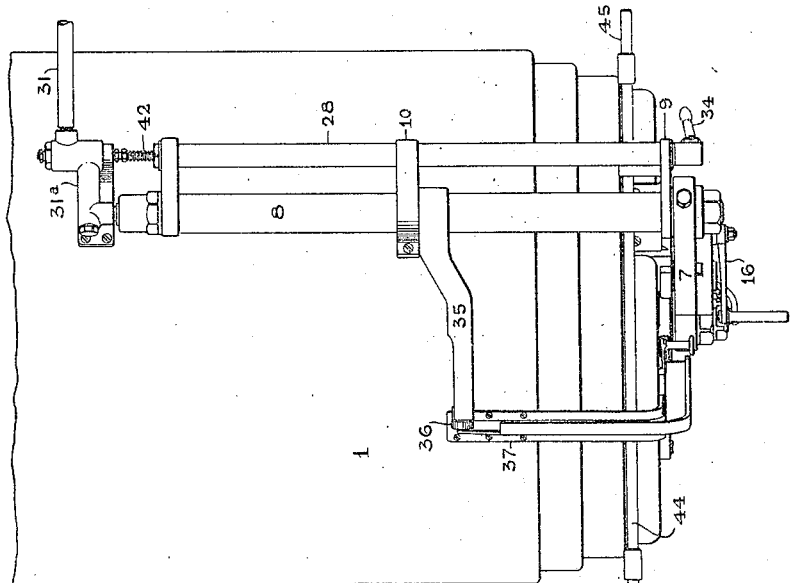
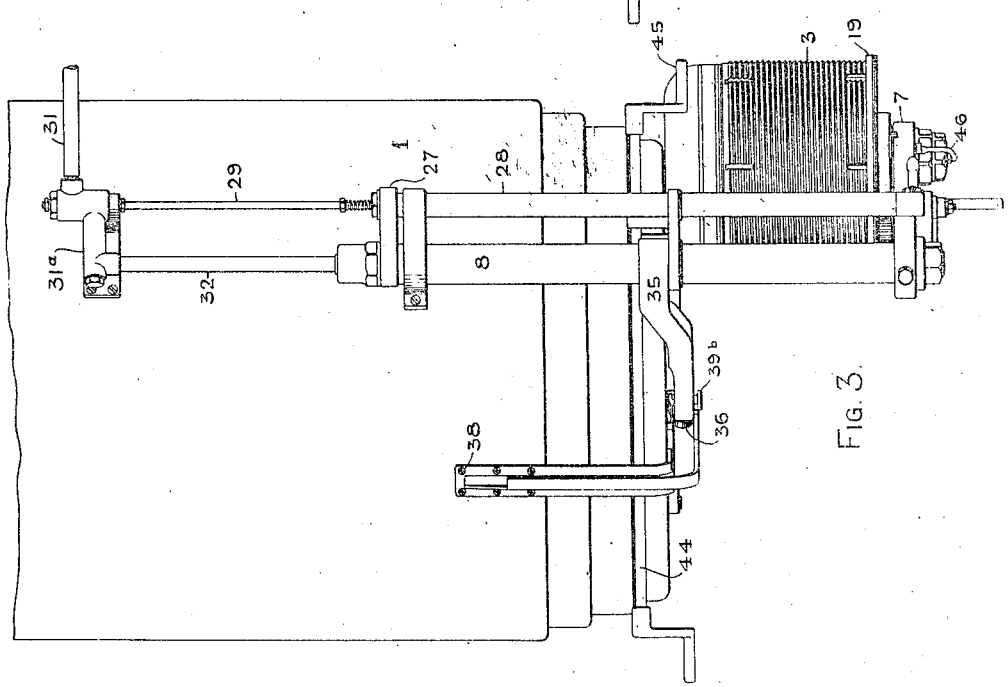
WITNESSES:
INVENTOR
Albert H. Emery
BY
Knight Bros
ATTORNEYS No. 772,345. PATENTED OCT. 18, 1904.
A. H. EMERY.
BREECH LOADING ORDNANCE.
APPLICATION FILED MAR. 2, 1901. RENEWED MAR. 12, 1904.
NO MODEL. 2 SHEETS—SHEET 2.

WITNESSES:

INVENTOR
Albert H Emery
BY
Knight Bros
ATTORNEYS.

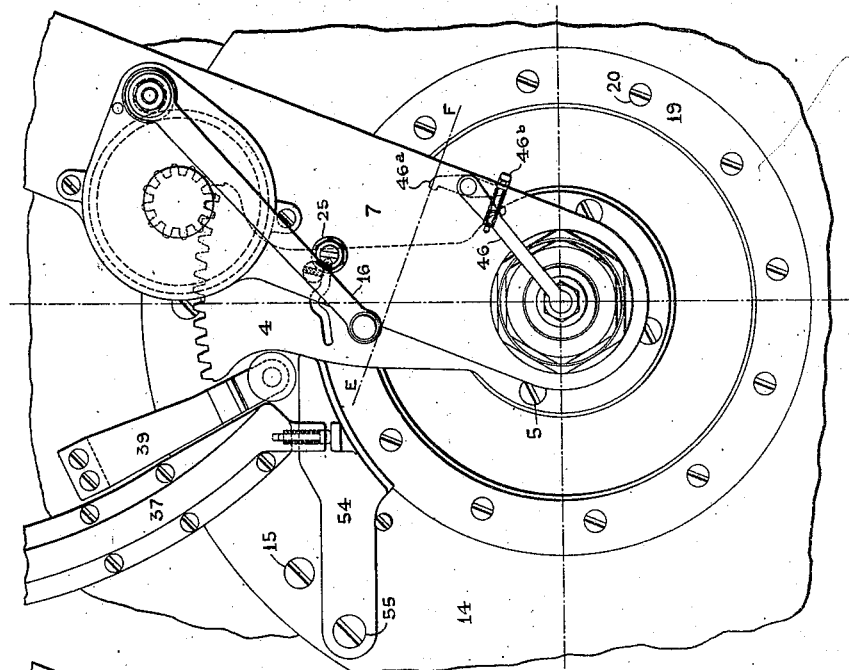
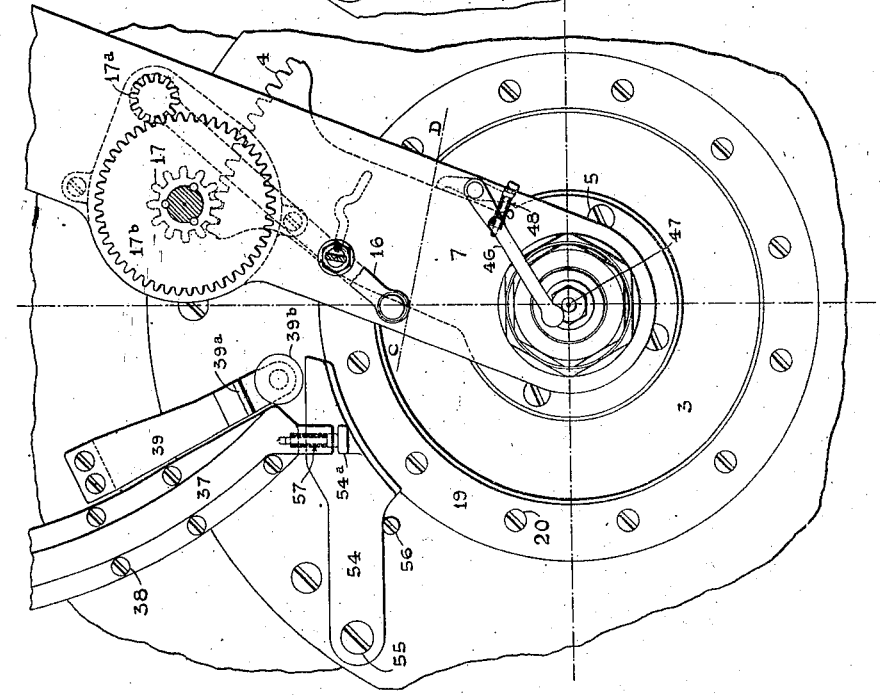

No. 772,345. PATENTED OCT. 18, 1904.
A. H. EMERY.
BREECH LOADING ORDNANCE.
APPLICATION FILED MAR. 2, 1901. RENEWED MAR. 12, 1904.
NO MODEL. 8 SHEETS—SHEET 6.
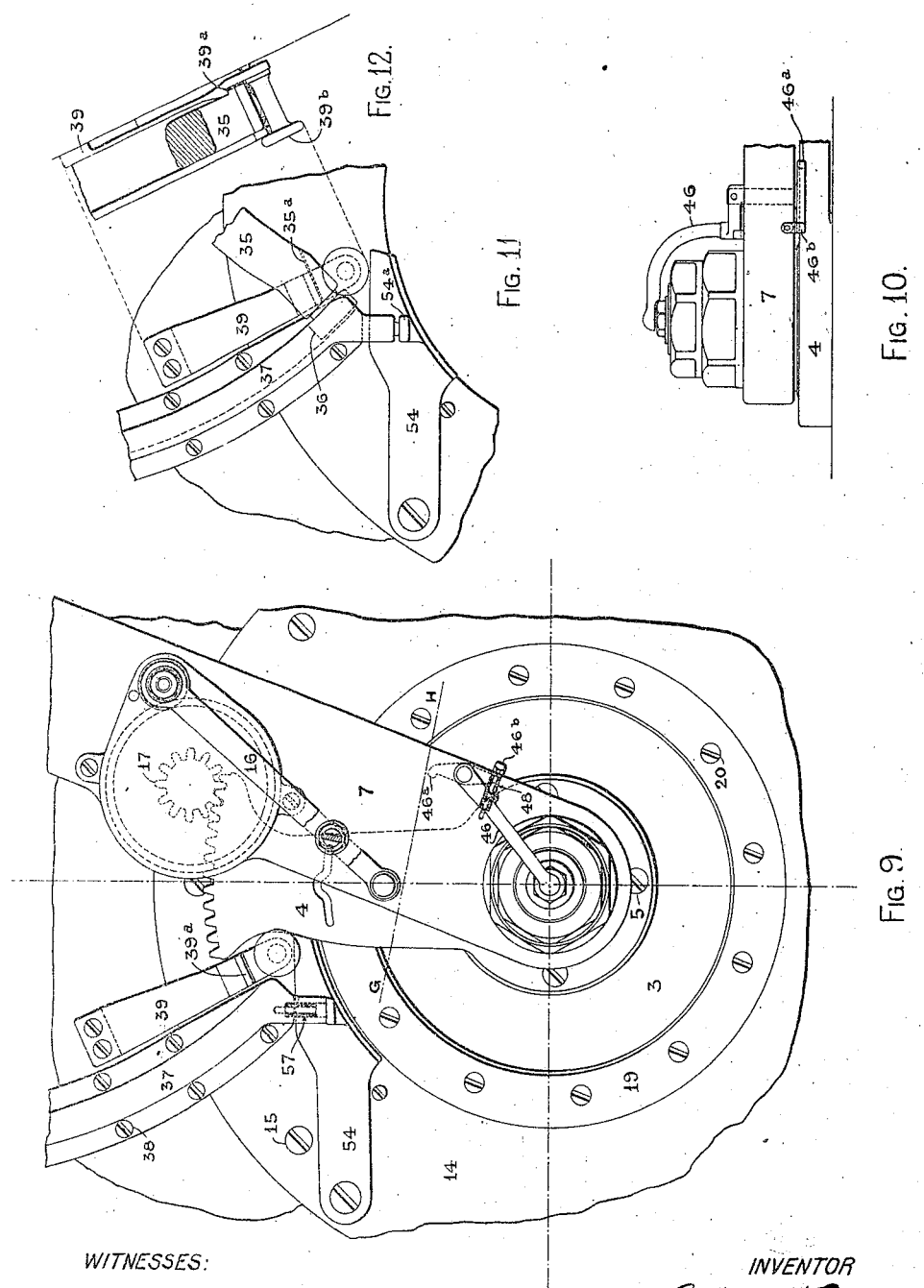
WITNESSES:
INVENTOR
Albert H. Emery
BY Knight Bros
ATTORNEYS No. 772,34?  
PATENTED OCT. 18, 1904.
A. H. EMERY.  
BREECH LOADING ORDNANCE.  
APPLICATION FILED MAR. 2, 1901. RENEWED MAR. 12, 1904.
NO MODEL.  
8 SHEETS—SHEET 7.
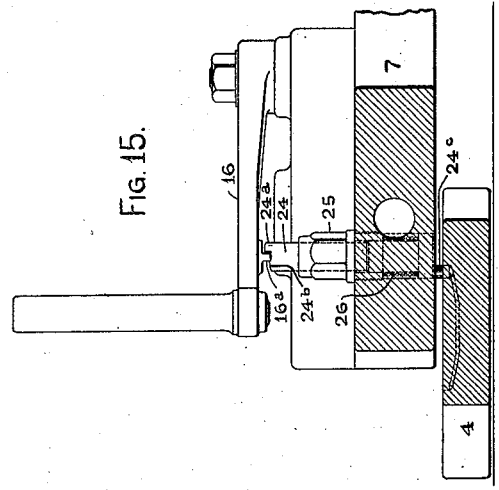
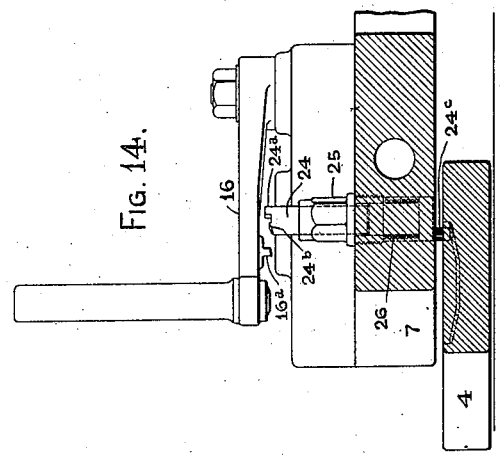
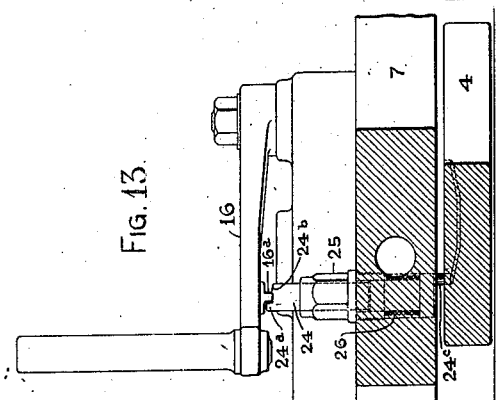
WITNESSES:
INVENTOR  
Albert H. Emery  
BY  
Knight Bros  
ATTORNEYS No. 772,345. PATENTED OCT. 18, 1904.
A. H. EMERY.
BREECH LOADING ORDNANCE.
APPLICATION FILED MAR. 2, 1901. RENEWED MAR. 12, 1904.
NO MODEL. 8 SHEETS—SHEET 8.
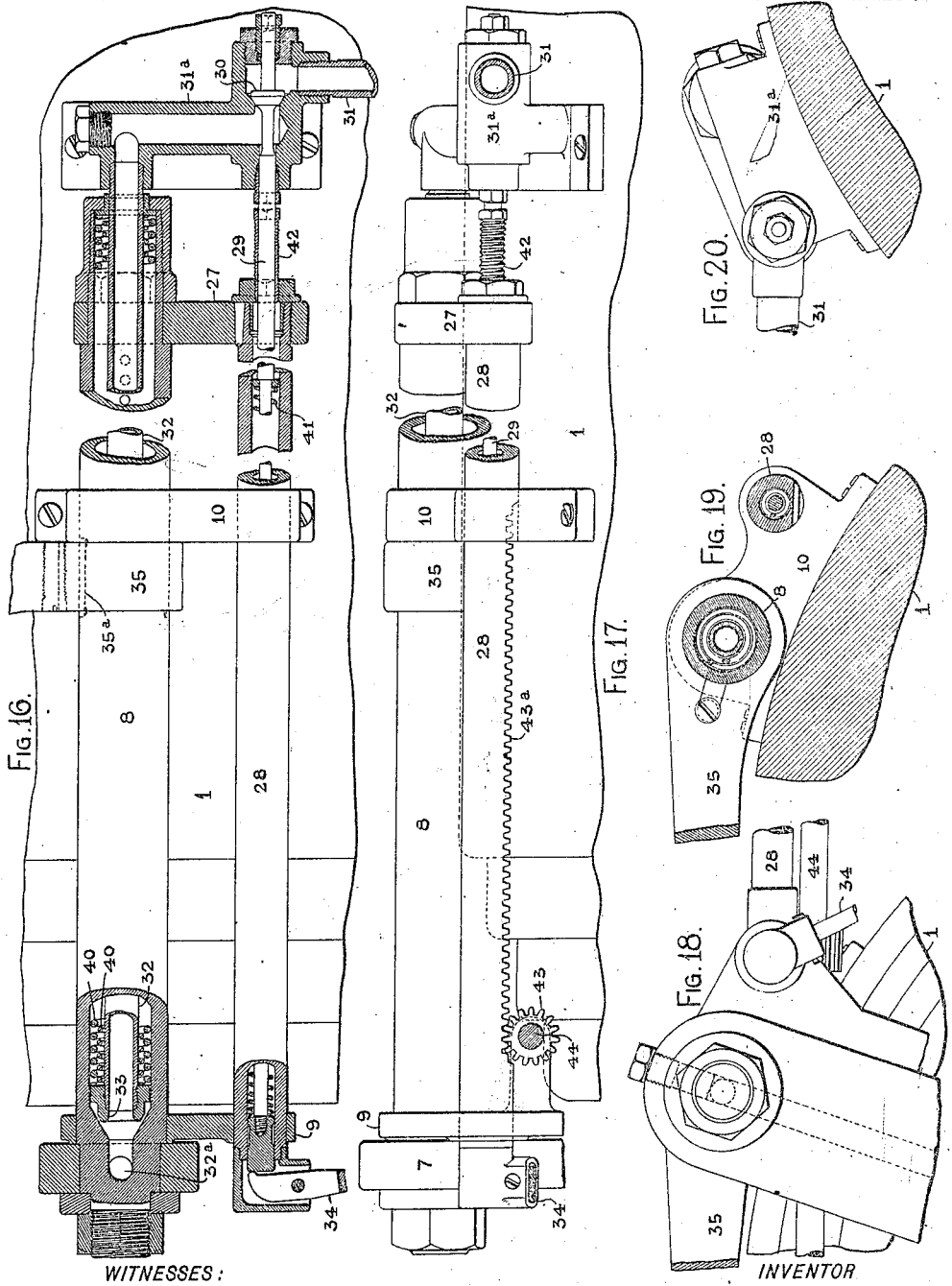
WITNESSES:
INVENTOR
Albert H. Emery
BY
Knight Bros
ATTORNEYS No. 772,345.

Patented October 18, 1904.

UNITED STATES PATENT OFFICE.

ALBERT H. EMERY, OF STAMFORD, CONNECTICUT.

BREECH-LOADING ORDNANCE.

SPECIFICATION forming part of Letters Patent No. 772,345, dated October 18, 1904.

Application filed March 2, 1901. Renewed March 12, 1904. Serial No. 197,891. (No model.)

*To all whom it may concern:*

Be it known that I, ALBERT H. EMERY, a citizen of the United States, and a resident of Stamford, in the county of Fairfield, in the State of Connecticut, have invented certain new and useful Improvements in Breech-Loading Ordnance, of which the following is a specification.

This invention is illustrated in the drawings by twenty figures, in which—

Figure 4:
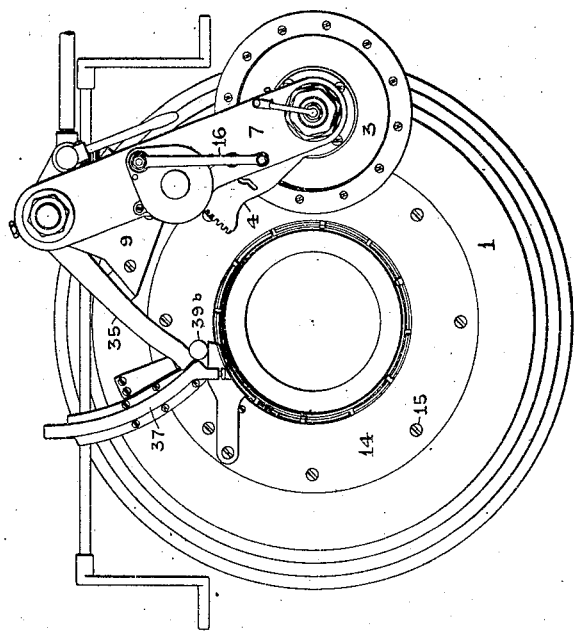
Figure 5:
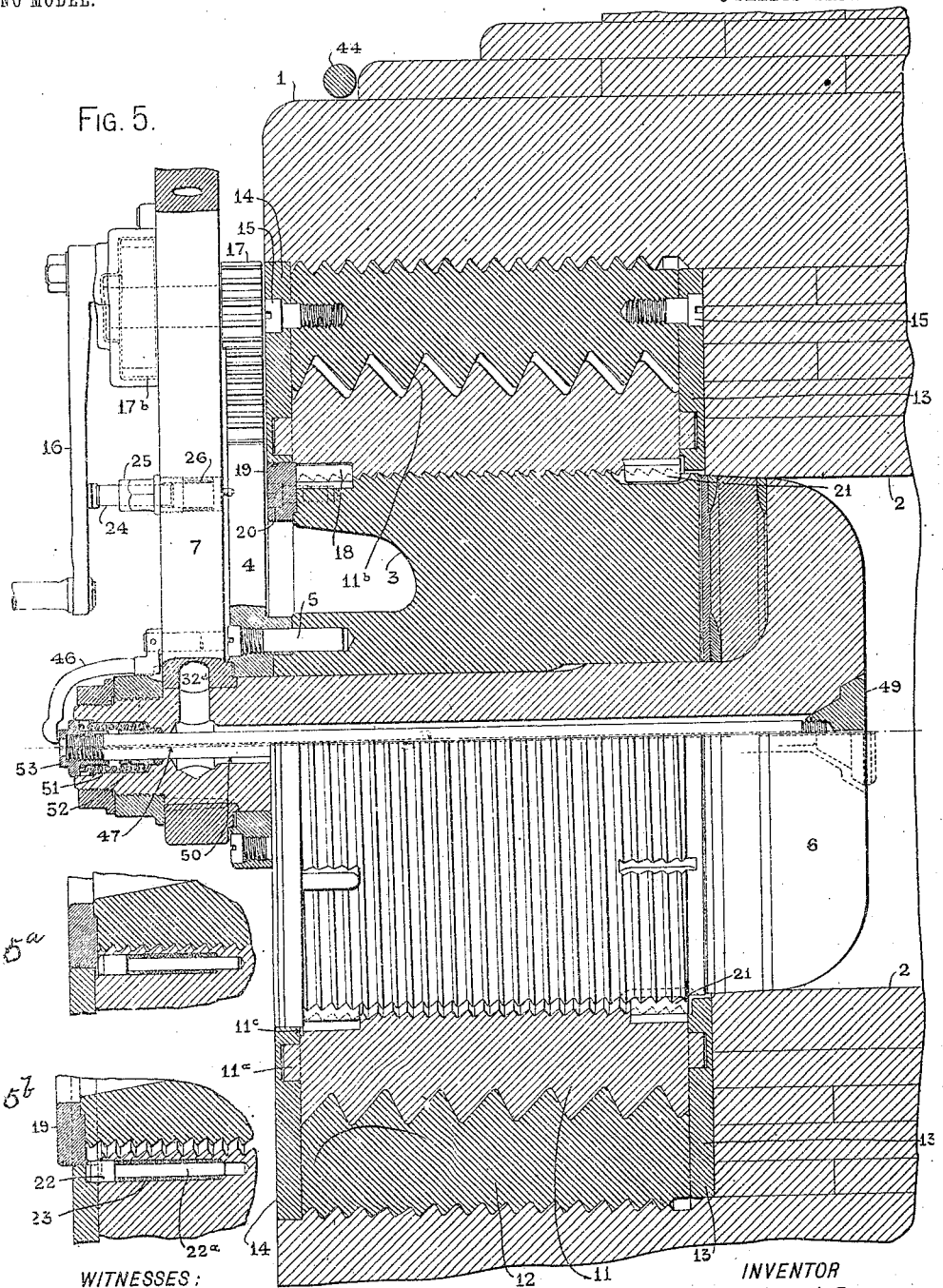
Figure 6:
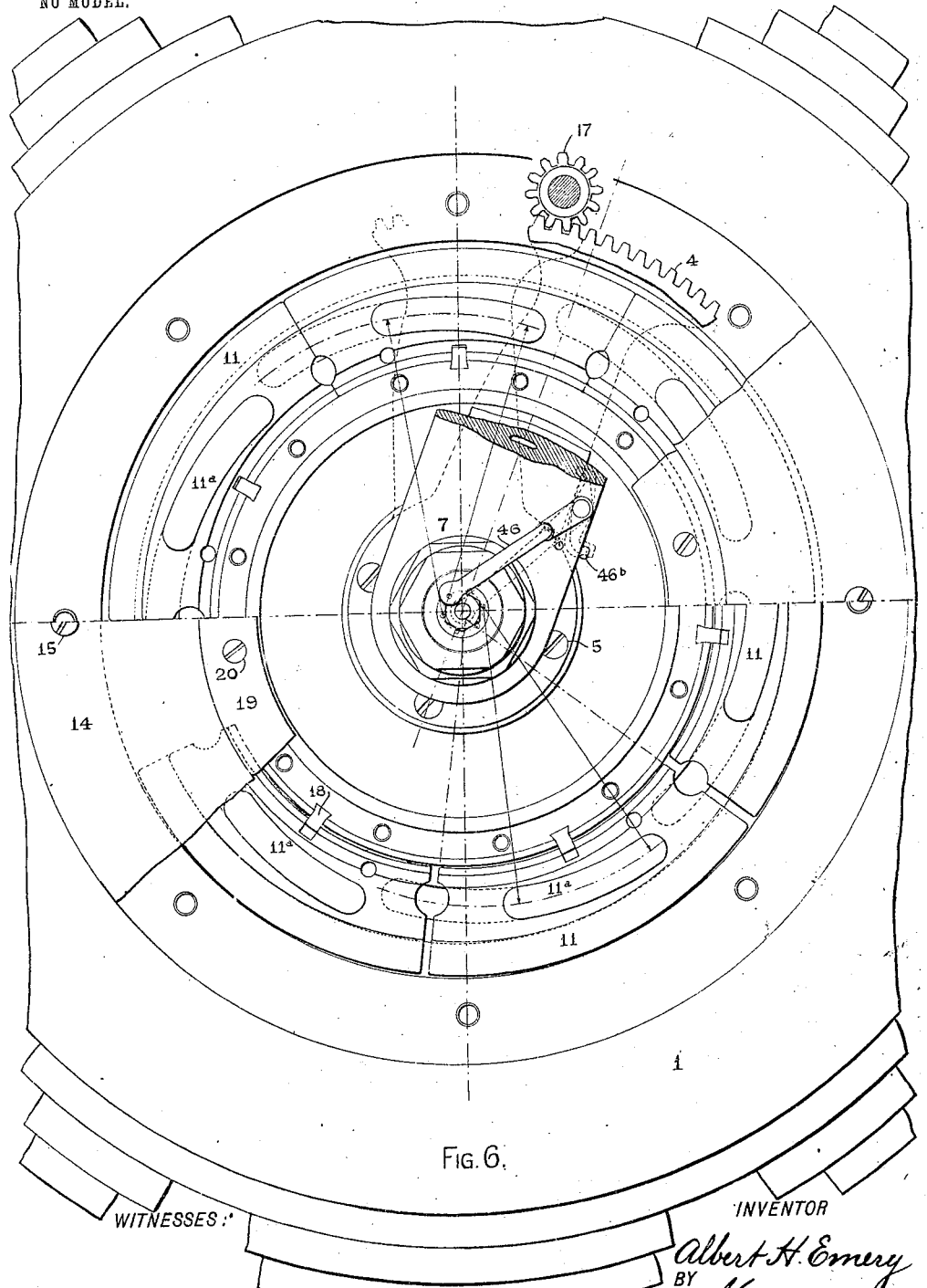

Figure 1 shows a plan of the breech of the gun with the breech-block closed. Fig. 2 is a rear elevation of the same. Fig. 3 is a plan of the breech of the gun with the breech-block open and swung to one side, showing the gun ready to receive the loading-sleeve. Fig. 4 is a rear elevation of the same. Fig. 5 is a sectional elevation of the breech of the gun, showing the breech-block and its attachments, partly in section and partly in elevation, in which the upper half shows the block locked in position ready for firing and the lower half shows it in rotated position with a segment of the locking-nut moved outward to position ready for withdrawal of the breech-block. Figs. 5$^a$ and 5$^b$ are detail views showing a locking-pin in the respective positions which it occupies when the parts of the breech mechanism are in the respective positions shown in the upper and lower halves of Fig. 5. Fig. 6 is a rear elevation of the breech of the gun with some of the parts removed. Fig. 7 is a rear elevation of the breech-block locked in position ready for firing. Fig. 8 is a rear elevation of the same with the breech-block rotated to nearly unlocked position. Fig. 9 is a view of the same parts with the block rotated fully to released position ready for withdrawal. Fig. 10 is a side elevation showing the vent-cover and parts to which it is attached. Fig. 11 is a rear view showing a small portion of the gun, a locking-latch to secure the block from premature movement outwardly, a portion of a guiding-arm, its roller, and a part of the track in which it runs, and the locking-spring which secures it in position when the block is swung to one side. Fig. 12 is a side elevation of this portion of the arm, a locking-latch, and the guiding-track which guides the arm in a portion of its path.

Fig. 13 is a sectional view of the arm attached to the breech-block, by which it is rotated, and of the arm which secures the block to the bar which carries it out of and into the gun, the sections being taken on the line C D, Fig. 7. It shows also in elevation a crank-arm, the pinion, and gear-case by which the block is rotated, and the locking-stud or stop which secures the crank in position when the block is locked in the breech of the gun ready for firing. Fig. 14 shows a view of the same parts, the section being made on the line E F, Fig. 8, when the crank has been revolved in unlocking the block until the geared block-arm has struck the releasing-catch and nearly reached the locking-stop. Fig. 15 shows the same parts with the block-arm and carrying-arm in section on the line G H, Fig. 9, with the revolution fully completed and the crank-stop engaged with the crank-arm, locking it in position to remain so while the block is swung out of the way for loading. Fig. 16 shows a plan of a portion of the breech of the gun with the bar which carries the breech-block out of and into the gun, partly in elevation and partly in section, with a section of the arm which attaches it to the block. It shows also this bar being used as a fluid-press to move the block outward and a spring or springs to aid in moving the block into the gun. It shows also an air pipe and passage through the carrying bar and arm which carries the block, together with a cut-off valve and means for operating it. Fig. 17 is a side elevation of the same, showing a rack and pinion to aid in moving the block to and from its seat in the gun. Fig. 18 shows a small portion of a rear elevation of the gun, the carrying-arm, and the air-passage therein with a pinion and its axis used in moving the block out or in and a portion of the lever which operates the inlet-valve of the pneumatic press. Fig. 19 shows a small portion of the gun in section with a sectional elevation of the pneumatic or fluid press contained in the carrying bar, the valve-bar case and valve-stem in section, the block through which these parts slide when the breech-block is moved backward and forward and by which they are attached to the gun, and a portion of the guiding-arm which guides the carrying-bar in its outward and inward movements. Fig. 20 shows a small portion of the breech of the gun in section with a front elevation of a block which carries the inlet-valve and has a passage communicating with the carrying-bar, this block being plainly shown in section in Fig. 16.

This invention relates to a means for facilitating rapid loading of guns by quickly expelling the powder gases from the chamber of the gun and cooling the breech apparatus and chamber of the gun after firing and rapidly and easily removing and returning the breech-block.

This invention is best adapted for use with all that class of blocks which are axially withdrawn from the gun and removed to one side while loading. I have herein shown it provided with means to impart to a breech-block a partial rotation to release it. The block may be supplied with the interrupted threads in the usual way; but I have preferably shown it in connection with a gun having a block with a continuous thread and an expanding-nut which releases on partial rotation, as described and claimed in a divisional application, and the construction of which is as follows:

In the figures, 1 shows the breech of the gun; 2, the chamber-lining; 3, the breech-block; 4, the rotating arm secured thereto by the screws 5.

6 is the mushroom passing through the block of which it forms a part and carrying on its outer end the arms 7, which attaches the breech-block to the carrying-bar 8, this bar being supported in position by blocks 9 and 10, the latter being secured to the gun by screws, the supporting-blocks 9 and 10 permitting the carrying-bar 8 to slide backward and forward therein.

Around the breech-block is a segmental nut 11, divided into any convenient number of parts. The drawings show this nut 11 divided longitudinally into six equal parts. This nut is threaded on the interior to fit the block and on the exterior to fit directly into the breech of the gun or into an intermediate screw-ring 12. If the threads on 11 do not fit directly into the breech of the gun, but into the intermediate ring 12, this ring should be screwed tightly into the gun and carry the two plates 13 and 14, secured thereto by screws 15. The segments of the retaining-nut 11 carry on each end a trunnion 11$^a$, which fit in grooves in the plates 13 and 14. These trunnions are elongated to prevent the segments from tipping. The grooves in which they work are of such length and position that when the trunnions are carried to the innermost part of these grooves the segments of the nut seize tightly the breech-block. By revolving the crank 16 to the left the block-arm 4 is also moved to the left, rotating the block 3, which carries the splines 18, which are doweled into the block at its rear end and secured there by the plate 19, this plate being secured to the block by the screws 20. At the front end of the segments of the nut 11 are splines 21, doweled to these segments. The splines 18 and 21 secure the rotation of the segmental nut 11 with the breech-block 3. In Fig. 6 three of the segments 11 are shown tightly locked by the trunnions 11$^a$ against the breech-block 3. They are shown in the same position in the upper half of Fig. 5, which shows the inner threads on nut 11 tightly fitting and securing the block 3, while the outer threads on the nut 11 are seated on their bearing-faces 11$^b$ in the retaining-nut 12. When the block 3 is rotated to the left through one-fifteenth of a revolution, the parts of the segmental nut 11 have a spiral movement and are carried until the trunnions 11$^a$ reach the outer end of the grooves in which they are moved, at which time the outer threads of the segmental nut fit tightly those in the screwing 12, and they are in a position shown in the lower halves of Figs. 5 and 6. When the parts of the segmental nut have been rotated to their extreme position to the left, they will be in the position shown in the lower halves of Figs. 5 and 6, having been moved radially outward sufficient to free their inner threads from those of the breech-block to allow the latter to withdraw. The parts of the segmental nut 11 carry locking-pins 22, Figs. 5$^a$ and 5$^b$, with stems 22$^a$, around which are spiral springs 23, which throw them into recesses behind plate 14 when the segments 11 have reached their outermost position and the breech-block 3 and its plate 19 have been moved slightly outward in the movement of retraction. These locking-pins hold the segments securely in position until the return of the breech-block, so they shall be in the right position to receive the splines 18 and 21, which cause the block and segments of the nut to revolve together. When the block nearly reaches its seat in the forward movement, plate 19 releases the locking-pins 22 to permit the rotation of the segmental nut.

24 is a stop-stud secured in the arm 7 by the sleeve 25. It carries around it a spring 26 to help operate it. At the upper end of this stop-stud is a shoulder 24$^a$, against which a lug 16$^a$ on the under side of the crank-arm strikes squarely when the block is locked in position and prevents the further movement of the crank in that direction. When the parts have their positions shown in Fig. 13, the lug 16$^a$ on the crank-arm fits behind a small projecting lug 24$^b$ on the locking-stud 24 and secures the crank in this position. When it is desired to release the block, a sudden pull on the crank 16 causes it to spring over the locking-shoulder 24$^b$ and the crank receives three full turns to the left. The locking-stud 24 has an eccentric-pin 24$^c$ projecting from its lower end into a curved path of variable depth. (Shown in Figs. 9, 13, 14, and 15.) The spring 26 causes the stud 24 to move downward to the extent the groove in the arm 4 permits, so that during the second revolution the stop is out of the way of the crank; but at the end of the third revolution the groove will have caused the stop to be raised to active position, with the bearing-face opposing further revolution of the crank, the stop having been turned half-way round, owing to the curved form of the groove in arm 4, which, through the action of the pin $24^c$, has caused the stop to revolve the one hundred and eighty degrees required to have its shoulder $24^a$ oppose squarely the movement of the lug $16^a$ and stop the crank 16 from further movement, where it is locked in position by the lug $24^b$ and held there while the block is withdrawn and swung out of the way during loading and returned again to its seat in the gun to be locked there by the required reverse movement of the crank, this locking-shoulder $24^b$ being high enough to hold the crank securely in position until a considerable pressure is put upon it to release it.

The crank 16 drives the pinion 17, which meshes with the arm 4 either directly, as is the case with small guns, or through the intermediate pinion and gears $17^a$ $17^b$, (shown in Fig. 7,) which is the desired form in the case of large guns.

27 is a cross-head connecting the carrying-bar 8 with the case of the valve-stem 29 of the valve 30, this cross-head being rigidly secured to the carrying-bar 8 and valve-stem cover 28, causing the two parts to have longitudinal movement together.

31 is a pipe to bring liquid or air to supply the fluid-press contained in the bar 8.

33 is a piston on the pipe 32, which carries air or liquid to the press-cylinder formed in the bar 8.

When the block has been released from its securing-nut ready for withdrawal, lever 34 (see Figs. 1 and 16) is used to open the valve 30, when air or fluid under pressure passes through the pipes 31 and 32 and acting on the piston 33 causes the bar or press-cylinder 8 to move to the rear sufficiently to carry the block out of the gun. During this longitudinal movement of the bar 8 it is kept from rotating by the arm 35, which is keyed thereto by a spline $35^a$, until the block has been carried so far to the rear that motion of rotation around bar 8 as an axis may properly begin. The arm 35 carries at its outer end a roller 36, which runs in the track 37, secured to the gun by screws 38. The front part of the track 37 is straight and parallel with the axis of the gun. The extreme rear portion is circular, the plane of its circle being normal to the axis of the gun. Between these parts is an intermediate curved portion adapted to guide the arm in such a way that the momentum of the block caused by its rapid movement outward is at that point changed to give it a swinging motion about the bar 8, which has its center of rotation best placed to one side of the vertical plane through the axis of the gun, as when so placed the weight of the block tends to swing the block out of the way for loading as soon as it has been withdrawn far enough to permit such rotation. This action of gravity and the momentum of the block produced by the quick motion to the rear and the action of the curved path on the arm 35 causes the block quickly to swing until the arm 7 has a vertical position, when the momentum in the block causes it to continue this movement until it has reached its extreme limit of motion to the right, when the spring-latch 39 operates to cause the locking-shoulder $39^a$ to engage with the locking-shoulder $35^a$ on the arm 35 and hold the block in that position while the gun is loaded, after which a smart blow on the knob $39^b$ of the latch 39 disengages these locking-shoulders, and the weight of the block causes it to act as a pendulum and swing into line with the axis of the gun. Friction of the moving parts, however, somewhat retards this motion and tends to prevent the block from coming back as far as it should.

In the carrying-bar 8 are one or more springs 40, which are set with initial compression and which are still further compressed by the outward movement of the bar. The compressive load on these springs acts to return the bar and begin this return as soon as the roller 36 on the end of the arm 35 has reached the double curved portion of its path in 37. This action of these springs enables the block under its pendulum action to swing into line with the axis of the gun and then move forward to its seat ready to be rotated and locked in position for firing. Liquid or air may be used in the press-in bar 8 to move it either or both ways. I prefer it usually to be operated by air in one direction only, preferably outwardly, using not only sufficient pressure to cause the block to move back quickly, but with sufficient force to compress the retarding-springs 40 and have the required desired momentum at the latter part of the rearward motion to assist the pendulum action of the block sufficiently to overcome the friction of the swinging parts and cause the block to swing sufficiently far to be locked out of the way of loading by the spring-latch 39. These springs 40 might be arranged to be used with tension instead of compression; but I prefer their use, as shown, with compression. The valve 30 has around its stem 29 an initially-loaded compression-spring 41. The initial load on this spring should be sufficient to cause it to shut the valve 30 when it is reached by the adjustable stop 42 in the outward movement of the block at that point where it is desired to shut off the press from further action—that is, when the inertia of the block is sufficient to continue the outward and rotary movement of the block with and around the bar 8 without further help of the press. This spring 41 should permit sufficient additional compression to allow the block to have all the longitudinal motion to the rear that is required. This additional compression of the spring 41 aids the spring 40 in checking the rearward motion at the latter part of the outward movement of the block and in accelerating the forward movement of the block when it has been swung to the left sufficiently far to allow the forward movement to begin. A pinion 43 on the shaft 44 is driven by cranks 45. This pinion works in a rack 43ª on the bar 28 to move the block out and in when the press in the carrying-bar 8 is not used, or if used when the pressure from this press is insufficient to carry the block back under the resisting action of the springs 40 and 41 and any unusual friction which may sometimes occur in the movements of the parts. The block may be carried in alone by the use of the pinion, rack, and driving-cranks; but the block is worked much more quickly to use the springs 40 and 41 with sufficient force to cause the block to return quickly without the help of the crank. When constructed as shown and the parts are moving harmoniously, the pneumatic pressure in the bar 8 should carry the bar back in about a second or less, and the pendulum action of the block, aided by the motion of the inertia of the block moving rapidly to the rear, should swing the block to the required position for loading in less than a second, and the pendulum action and the force stored in the springs 40 and 41 should return the block to its position ready to be locked in less than two seconds. Should any delay of this motion occur, owing to dirt or friction of the parts or insufficient pressure of the air or springs, the use of the cranks 45 and their connections immediately overcomes any delay and helps the parts move to their proper positions.

46 is a vent-cover carried by the arm 7. (Best shown in Figs. 9 and 10.) At the lower end of this cover is an arm 46ª, with a lug so adjusted that just as the block is locked in position for firing the arm 4 strikes this lug and removes the cover 46 from the vent-opening 47, where it remains until the block begins the reverse movement for unlocking, when immediately the action of the spring 48 working against the lug 46ᵇ of the cover 46 causes the cover to again swing over the vent, where it remains until the block is again locked in position ready for firing, the vent-cover being then removed, as previously explained, by the arm 4 striking against the projection 46ª.

In the rapid action of ordnance the quick removal of the gases from the gun is very desirable, for which purpose I bring, through the pipes 31 31ª 32 and the passage 32ª in the arm 7, a current of air under pressure to the longitudinal passage through the center of the mushroom or breech-block, where it opens the valve 49, carried on the stem 50 and closed automatically by the spring 51, contained between the packing-sleeve 52 and screw-collar 53, mounted on the head of the valve-stem 50, to prevent rearward flow of gases when the gun is fired. After firing the gun air is let through the valve 30 to quickly expel the gases from the chamber and continues to flow until the valve 30 is closed by the operation of the breech mechanism when the block is moved back sufficiently far, as before described. Means may readily be provided to close this valve previous to opening the breech-block at all; but I prefer the arrangement shown, where the valve is open and remains so until the block has moved to the rearward for a large portion of its stroke, when it is automatically closed by the movement of the block, as this removes the gases from the chamber sufficiently with very slight loss of time. The use of this air under sufficient pressure to properly do the work above referred to has the additional advantage that such air coming from the pump or reservoir becomes greatly expanded in passing through the breech apparatus and into the powder-chamber. Such expansion makes it very cold and causes it to rapidly cool the block and powder-chamber. When it does not pass through the block or directly into the chamber, the cooling effect on the block is much less. In passing through the pneumatic press and block, as described, some of it is discharged around the breech-block to the rear of the gun into the turret or compartment in which the gun is placed, expelling some of the hot air in which the gunners are working and cooling to an appreciable extent the remainder, thus serving to aid the gunners in the rapid performance of this work by first giving rapid action to the breech-block; second, expelling the gases from the powder-chamber of the gun and preventing this coming into the turret or casement where the gun is being worked, and, thirdly, keeping the air not only purer, but cooler than would be the case if the compressed air were not used. This is very desirable, as the men become greatly heated when working the guns. If the pneumatic press is used as here shown, I prefer to open the valve by lever 34 just before beginning to loosen the breech-block ready for retraction and allow the air to continue to flow through the pneumatic press and block into the gun until the block is removed sufficiently far to cause a considerable escape of air to the rear when the valve is closed, as before explained, by the adjustable stop 42 striking against the collar at the end of the spring 41 on the valve-stem 29.

If the pneumatic press is used, as shown, the size of the passages for the air-flow and the pressure of the air will have to be carefully considered and properly proportioned in order that the flow through the valve 49 may not reduce the pressure in the press-cylinder 8 too low to give the proper action or movement to the parts. When the air-pressure is to enter through the valve 30 before the block is released from its retaining-nut 11, it will be necessary to make use of the locking-latch 54 to prevent rearward movement of the block before it is fully released. The action of this catch is well illustrated in Figs. 7 to 11, inclusive, where the catch is shown secured on a fulcrum-screw 55 and pressed normally against the stop 56 by the spring 57. When in this position, as shown in Figs. 7 and 8, the block cannot be removed; but when rotation has occurred until the arm 4 strikes the catch 54, which happens just before the final release, the arm 4 forces the catch or lock 54 to move upward and release the block ready for withdrawal, the catch remaining up, as shown in Fig 9, until the plate 19 has receded beyond it, when under the action of the spring 57 it again falls to the position shown in Fig. 11 and remains there until pushed aside by the plate 19 on the rear of the block as it reënters the gun, when the spring 57 again pushes it to the position shown in Fig. 7 and locks the block in the gun. A lug on the track 37, projecting over the locking-bar 54, holds it down against the action of the pneumatic press, which is trying to push the block outward when air-pressure is let therein.

Having thus described my invention, what I claim as new therein, and desire to secure by Letters Patent, is—

1. In combination with a threaded breech-block rotating on its own axis to engage or disengage with the breech of the gun, an exterior arm to carry the block while released from the breech; said arm having an axis of revolution parallel to the axis of the gun, about which it rotates to swing the breech-block out of the way while loading the gun, said arm having mounted upon it and swinging out of the way with it, a crank and pinion geared to said block for rotating the latter on its axis.

2. In combination with a threaded breech-block rotating on its own axis to engage or disengage with the breech of the gun, an exterior arm to carry the block while released from the breech; said arm having an axis of revolution parallel to the axis of the gun, about which it rotates to swing the breech-block out of the way while loading the gun, said arm having mounted upon it and swinging out of the way with it, a crank and pinion geared to said block for rotating the latter on its axis, with means also mounted on said arm to lock the crank-arm against further motion in either direction when the block has been rotated sufficiently to permit its withdrawal from the gun and prevent rotation relatively to the swinging arm while out of the breech.

3. In combination with a threaded block that rotates on its axis to engage or disengage with the breech of the gun, an arm 4, secured to the block to rotate it, a supporting-arm 7, for said block, by which to swing it out of the way when loading, a crank 16 mounted on said supporting-arm for rotating said block through the medium of arm 4 and an automatically-revolving arresting and releasing stop carried by the supporting-arm 7, positively stopping further movement of the crank beyond the desired limit of its motion in either direction, but permitting motion in a reverse direction, when locking and unlocking the block.

4. In combination with a threaded breech-block that rotates on its axis to engage or disengage with the breech of the gun, a crank-arm imparting said rotation to the block, and a stop arresting the rotation of the crank in the direction of locking, only when the block has been rotated until fully locked in its seat, and in the opposite direction, only when said block has been rotated sufficiently to fully release it for withdrawal, said stop having means whereby it is withdrawn from the path of the crank to permit necessary intermediate revolutions thereof, and returning to its arresting position when the crank reaches its proper limit of motion in either direction.

5. In combination with a threaded block that rotates on its axis to engage or disengage with the breech of the gun, an arm 4, secured to the block to rotate it, a supporting-arm 7, for said block, having an axis of rotation parallel to the longitudinal axis of the gun, by which to swing it out of the way when loading, a crank 16 mounted on said supporting-arm for rotating said block through the medium of arm 4, and a rotating reversing-stop carried by the supporting-arm 7, positively arresting and preventing motion of the crank beyond the desired limit in either direction when locking and unlocking the block.

6. In combination with a threaded block that rotates on its axis to engage or disengage with the breech of the gun, an arm 4, secured to the block to rotate it, a supporting-arm, 7, for said block, by which to swing it out of the way when loading, a crank 16 mounted on said supporting-arm for rotating said block through the medium of arm 4, and a reversing-stop carried by the supporting-arm 7, positively arresting and preventing further motion of the crank when it arrives at the desired limit of its motion in either direction when locking and unlocking the block, and means for reversing said stop to present its arresting-seat to the crank at the desired limit of motion in either direction.

7. In combination with a breech-block, a bar by which the block is supported, having longitudinal motion to move the block out of and into the gun; said bar being adapted to rotate about its axis and having its axis located on the gun above the horizontal and to one side of the vertical plane of the longitudinal axis of the gun to cause the block, under the action of its weight, to swing to one side when withdrawn from the breech of the gun for loading, and to return to the axis of the gun after loading.

8. In combination with a breech-block a bar mounted on the gun with its axis above, to one side of and parallel with the axis of the gun, by which the block is supported to allow it to swing out of the way when loading, said bar having longitudinal motion to move the block out of and into the gun, and being provided with a rack, pinion and crank to impart said longitudinal movement.

9. In combination with the breech-block, a bar mounted on the gun, with its axis parallel to, and above and to one side of the longitudinal axis of the gun, provided with longitudinal motion to move the block into and out of the gun, adapted to rotate upon its axis to permit the block to be swung out of the way in loading, and provided with means to secure and hold the block to one side during the time of loading.

10. In combination with a breech-block, a bar mounted on the gun with its axis parallel to, and above and to one side of the longitudinal axis of the gun, provided with longitudinal motion to move the block into and out of the gun, adapted to rotate upon its axis to permit the block to be swung out of the way in loading, and provided with an arm 35, rigidly secured to said bar, and a spring-catch 39, engaging said arm when the block has been swung out of the way, to secure and hold the block to one side during the time of loading.

11. In combination with a breech-block, and its supporting-arm 7, permanently secured thereto, a bar parallel to the longitudinal axis of, and mounted on the gun, provided with longitudinal motion to move the block into and out of the gun, adapted to rotate upon its axis to permit the block to be swung out of the way in loading, and provided with a guiding-arm 35 mounted on and rigidly secured to said bar, and a spring-catch 39, engaging said arm when the block has been swung out of the way, to secure and hold the block to one side during the time of loading, and a guiding-track for said arm 35, securing the proper longitudinal and rotary motions of the bar 8, and defining the path of the breech-block during its longitudinal and swinging motions.

12. In combination with a breech-block, a block-supporting bar parallel with the axis of the gun having longitudinal movement to carry the block into and out of the gun, and rotating upon its axis to permit the swinging of the block out of the way when loading, the axis of said bar being located to one side of the vertical plane through the axis of the gun, to aid the block to swing to and from the axis of the gun, a guiding-arm projecting rigidly from said bar, and a guiding-track in which the outer end of said arm bears, shaped to cause energy of gitudinal movement to assist the swinging movement of the block, and vice versa.

13. In combination with a breech-block, a bar parallel to the longitudinal axis of the gun, provided with longitudinal motion to move the block into and out of the gun, adapted to rotate upon its axis to permit the block to be swung out of the way in loading, and provided with an arm 35, rigidly secured to said bar, and a spring-catch 39, engaging said arm when the block has been swung out of the way, to secure and hold the block to one side during the time of loading, and a guiding-track for said arm 35, to secure the proper rotation of the bar 8, and define the path of the breech-block into and out of the gun, said track having a portion of its length parallel with the axis of the gun, a circular portion lying in a plane normal to the axis of the gun, and a curved intermediate part joining these two portions of the track with a curvature adapted to cause the arm to swing the block in such a manner as to translate a portion of the energy due to the axial movement of the block, into a swinging movement when the arm is guided by the circular path and vice versa.

14. In combination with a breech-block, a carrying-bar therefor with its axis parallel to the axis of the gun and having a longitudinal movement permitting movement of the breech-block into and out of the gun, and rotary movement permitting the block to swing out of the way when loading, and a spring opposing the outward movement of the block and assisting its inward movement.

15. In combination with a breech-block, a carrying-bar therefor, mounted upon the gun with its axis parallel to, and above and to one side of the longitudinal axis of the gun, and having a longitudinal movement permitting movement of the breech-block into and out of the gun, and rotary movement permitting the block to swing out of the way when loading, and a fluid-press to impart longitudinal movement to said carrying-bar.

16. In combination with a breech-block, a carrying-bar therefor mounted upon the gun with its axis parallel to, and above and to one side of the longitudinal axis of the gun, having longitudinal movement to carry the block out of and into the gun, a fluid-press imparting motion to said block in one direction and a rack, pinion and crank imparting motion in the opposite direction.

17. In combination with a breech-block, a carrying-bar therefor with its axis parallel to the axis of the gun and having a longitudinal movement permitting movement of the breech-block into and out of the gun, and rotary movement permitting the block to swing out of the way when loading, a fluid-press, and a spring to aid in imparting and controlling the longitudinal movement of said carrying-bar.

18. In combination with a breech-block, a carrying-bar therefor, having longitudinal movement to carry the block out of and into the gun, a fluid-press imparting motion to said block in one direction and a rack, pinion and crank, and a spring imparting motion in the opposite direction.

19. In combination with a breech-block, a carrying-bar therefor, with its axis parallel to the axis of the gun and having a longitudinal movement permitting movement of the breech-block into and out of the gun, and rotary movement permitting the block to swing out of the way when loading, and a fluid-press and a spring to aid in controlling the longitudinal movement of said carrying-bar, the fluid-press being adapted to overcome the spring and move the block outward, and the spring adapted to return the block when the pressure of the fluid is partially or wholly removed.

20. In combination with a breech-block, a carrying-bar therefor with the axis parallel to the axis of the gun and having a longitudinal movement permitting movement of the breech-block into and out of the gun, and rotary movement permitting the block to swing out of the way when loading, and a fluid-press to impart longitudinal movement to said carrying-bar; and a valve through which fluid is supplied to operate said press, adjusted to close when the block has been partly withdrawn from the gun.

21. In combination with a breech-block, a carrying-bar therefor with its axis parallel to the axis of the gun and having a longitudinal movement permitting movement of the breech-block into and out of the gun, and rotary movement permitting the block to swing out of the way when loading, and a fluid-press to impart longitudinal movement to said carrying-bar, a valve through which fluid is supplied to operate the press, an initially-compressed spring confined between shoulders on the stem of said valve, and a moving part brought into engagement with said spring to close the valve after the block has been partially withdrawn from the gun, said spring being further compressible in the further movement of the block.

22. A gun having an air-passage extending into the powder-chamber, through which air may be blown to eject gases, and an automatic check-valve preventing flow of powder-gases through said passage at time of firing, but permitting introduction of air to expel the powder-gases after firing.

23. A gun having an air-passage extending into the powder-chamber through which air may be blown to eject gases while the breech-block is closed, and a valve preventing flow of powder-gas through said passage at time of firing, but permitting introduction of air to expel the powder-gases after firing and before opening the breech-block.

24. A breech-block having an air-passage extending through it through which air may be blown to eject gases, and a valve preventing backflow of gases through said passage at time of firing.

25. A breech-block having a passage opening into the chamber of the gun, through which air may be blown to remove the gases from said chamber, a check-valve in said passage closing against pressure of gases in the chamber at time of firing and opened under pressure of air introduced through the passage to expel gases from the chamber.

26. In combination with a gun and its breech-block, a bar 8, with its axis parallel to the axis of the gun by which the block is moved into and out of the gun, an arm 7, securing the block to said bar and a passage through said block, arm and bar, through which air may be passed to expel the gases from the gun after firing.

27. A breech-block having a passage opening into the chamber of the gun, through which air may be blown to remove the gases from said chamber, a check-valve in said passage closing against pressure of gases in the chamber at time of firing and opened under pressure of air introduced through the passage, to expel gases from the chamber, and a cut-off valve through which air is supplied to said passage.

28. A breech-block having a passage opening into the chamber of the gun, through which air may be blown to remove the gases from said chamber, a check-valve in said passage closing against pressure of gases in the chamber at time of firing and opened under pressure of air introduced through the passage, to expel gases from the chamber, and a cut-off valve through which air is supplied to said passage; means for withdrawing the breech-block from the gun, controlling said cut-off valve and closing the same when the breech-block has been partly withdrawn from the gun.

29. In combination with a gun, a pneumatic press and an air-passage conducting compressed air from the press to the powder-chamber of the gun, an automatic check-valve which prevents the backflow of powder-gases at time of firing but permits the introduction of air to expel these gases from the gun before opening the breech-block.

30. In combination with a gun and its breech-block, a pneumatic press to impart longitudinal movement to the block, a pipe 31 for conveying air to operate said press, and a passage through the breech-block, communication between said press and the chamber of the gun, through which air supplied to said press enters the chamber of the gun to expel the gases therefrom, and a check-valve in said passage closing it against the gases produced in firing.

31. In combination with a gun having a threaded breech-block, a catch 54, holding the block against longitudinal movement, and means for rotating said block to release it, engaging said catch and displacing it after the block's threads are disengaged, to permit retraction of said block.

32. In combination with a gun and its threaded breech-block, means rotating said block for unlocking it, a pneumatic press to impart longitudinal movement to the block, means for supplying air to operate said press, and a passage communicating between said press and the chamber of the gun, through which air supplied to said press enters the chamber of the gun to expel gases therefrom, after firing, and a catch holding the block from outward movement, but permitting rotation of the block, until the threads of the block have been fully released by rotation of the block.

33. In combination with a gun and its threaded breech-block, a pneumatic press to impart longitudinal movement of the block, means for supplying air to operate said press, and a passage communicating between said press and the chamber of the gun, through which air supplied to said press enters the chamber of the gun to expel gases therefrom, and a catch holding the block from outward movement until the threads of the block have been fully released by rotation of the block, an inlet-valve through which air is supplied, and means to close said valve when the block has been partly withdrawn from the gun.

34. In combination with a rotating breech-block and its supporting-arm 7, the vent-cover 46, supported and fulcrumed in said arm, a spring 48, moving said cover over the vent, and a projection 46ª on the vent-cover, in the path of, and engaged by a part of the rotating block, to throw the vent-cover off the vent while the breech-block remains locked.

ALBERT H. EMERY.

Witnesses:
HERVEY S. KNIGHT,
EDWIN S. CLARKSON.